United States Patent
Nalliah et al.

(10) Patent No.: US 11,263,594 B2
(45) Date of Patent: Mar. 1, 2022

(54) INTELLIGENT MEETING INSIGHTS

(71) Applicant: Microsoft Technology Licensing, LLC, Redmond, WA (US)

(72) Inventors: Selvaraj Nalliah, Redmond, WA (US); Cindy Kwan, Redmond, WA (US); Chu Liu, Bellevue, WA (US); Kevin Timothy Moynihan, Barcelona (ES); Abhishek Arun, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 192 days.

(21) Appl. No.: 16/456,038

(22) Filed: Jun. 28, 2019

(65) Prior Publication Data

US 2020/0410453 A1 Dec. 31, 2020

(51) Int. Cl.
| | |
|---|---|
| *G06Q 10/00* | (2012.01) |
| *G06Q 10/10* | (2012.01) |
| *G06F 16/93* | (2019.01) |
| *G06N 20/00* | (2019.01) |
| *G06F 16/29* | (2019.01) |
| *G06F 3/0482* | (2013.01) |
| *G06F 40/279* | (2020.01) |

(52) U.S. Cl.
CPC ......... *G06Q 10/1095* (2013.01); *G06F 16/29* (2019.01); *G06F 16/93* (2019.01); *G06N 20/00* (2019.01); *G06F 3/0482* (2013.01); *G06F 40/279* (2020.01)

(58) Field of Classification Search
None
See application file for complete search history.

(56) References Cited

U.S. PATENT DOCUMENTS

| | | | |
|---|---|---|---|
| 8,799,336 B1* | 8/2014 | Burgess | G06F 16/93 |
| | | | 707/829 |
| 8,849,907 B1* | 9/2014 | Hession | H04M 3/563 |
| | | | 709/204 |
| 2004/0003042 A1* | 1/2004 | Horvitz | G06Q 10/109 |
| | | | 709/204 |

(Continued)

OTHER PUBLICATIONS

Joe Tullio, Jeremy Goecks, Elizabeth D. Mynatt, David H. Nguyen (Augmenting Shared Personal Calendars, UIST'02, Oct. 27-30, 2002, Paris, France). (Year: 2002).*

*Primary Examiner* — Hafiz A Kassim

(57) ABSTRACT

In non-limiting examples of the present disclosure, systems, methods and devices for surfacing and interacting with electronic meeting insights are presented. A meeting request that includes a plurality of invitees may be received. The meeting request may be associated with a plurality of related documents based on one or more attributes and a meeting insight related to the related documents may be surfaced. The meeting request may have a low acceptance in relation to a threshold and a corresponding insight may be surfaced to reschedule the meeting. A user may send a time modification suggestion to the meeting organizer and a rescheduling insight may be surfaced. Time and location information corresponding to invitees and the meeting time may be analyzed and reminders may be surfaced for each of the invitees in relation to a meeting location. Attendees may interact with location-based insights to have directions to a meeting surfaced.

20 Claims, 13 Drawing Sheets

(56) References Cited

U.S. PATENT DOCUMENTS

| | | | |
|---|---|---|---|
| 2004/0168133 A1* | 8/2004 | Wynn | G06Q 10/109 715/255 |
| 2008/0263550 A1* | 10/2008 | Su | G06Q 10/06 718/102 |
| 2009/0300514 A1* | 12/2009 | Jania | G06Q 10/109 715/751 |
| 2010/0235446 A1* | 9/2010 | Hehmeyer | H04N 21/8358 709/205 |
| 2011/0072367 A1* | 3/2011 | Bauer | G06F 3/04815 715/757 |
| 2013/0096813 A1* | 4/2013 | Geffner | H04W 4/60 701/117 |
| 2013/0191719 A1* | 7/2013 | Underhill | G06Q 10/1095 715/231 |
| 2013/0246912 A1* | 9/2013 | Siu | G06Q 10/10 715/255 |
| 2014/0337751 A1* | 11/2014 | Lim | G06F 40/279 715/744 |
| 2015/0046367 A1* | 2/2015 | Libin | G06Q 10/10 705/342 |
| 2015/0248410 A1* | 9/2015 | Stickler | H04L 67/10 707/728 |
| 2016/0125346 A1* | 5/2016 | Krantz | G06Q 10/06395 705/7.41 |
| 2016/0283912 A1* | 9/2016 | Kilicli | G06Q 10/1095 |
| 2016/0328681 A1* | 11/2016 | Portnoy | G06Q 50/01 |
| 2016/0350721 A1* | 12/2016 | Comerford | G06Q 10/1093 |
| 2016/0373387 A1* | 12/2016 | Reyes | G06Q 10/101 |
| 2017/0004181 A1* | 1/2017 | Ashall | G06F 16/9024 |
| 2017/0017928 A1* | 1/2017 | Miller | G06Q 10/1095 |
| 2017/0118271 A1* | 4/2017 | Reyes | H04L 67/06 |
| 2017/0178080 A1* | 6/2017 | Abebe | G06F 16/383 |
| 2017/0308866 A1* | 10/2017 | Dotan-Cohen | H04L 43/0876 |
| 2017/0372267 A1* | 12/2017 | Softer | G06Q 10/1095 |
| 2018/0032997 A1* | 2/2018 | Gordon | G06Q 30/0269 |
| 2018/0046957 A1* | 2/2018 | Yaari | G06Q 10/1095 |
| 2018/0107987 A1* | 4/2018 | MacKenzie | G06Q 10/1095 |
| 2018/0107988 A1* | 4/2018 | Codella | G06Q 10/1095 |
| 2018/0165621 A1* | 6/2018 | Guo | G06Q 10/06398 |
| 2019/0028520 A1* | 1/2019 | Nawrocki | H04L 65/1073 |
| 2019/0266573 A1* | 8/2019 | Radhakrishnan | G06Q 10/1095 |
| 2020/0410456 A1* | 12/2020 | Sexau | H04L 12/1822 |

\* cited by examiner

US 11,263,594 B2

INTELLIGENT MEETING INSIGHTS

BACKGROUND

Electronic calendars and messaging applications that are integrated with those electronic calendars are ubiquitous in business environments and are increasingly being used for the scheduling of personal events. Despite meetings being integrated with users' electronic calendars, most meetings remain unproductive and a point of contention. Reasons that meetings remain unproductive include: attendees have not responded to invites, meeting invites do not include a meeting location, invitees (and meeting organizers) do not arrive on time, and attendees have not reviewed essential preparation materials.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for providing meeting insights. The meeting insights are useful for enhancing meeting productivity. The meeting insights may be surfaced based on analysis of various electronic meeting invite signals, processing of resources and their attributes in a graphical matrix form, and/or application of natural language processing and machine learning models to resources to identify relevant meeting content. The meeting insights may be static or dynamic in nature. In some examples, the meeting insights may be interacted with and operations to enhance meeting productivity associated with the interactions and insight types may be performed.

BRIEF DESCRIPTION OF THE DRAWINGS

Non-limiting and non-exhaustive examples are described with reference to the following figures.

DETAILED DESCRIPTION

Figure 1:
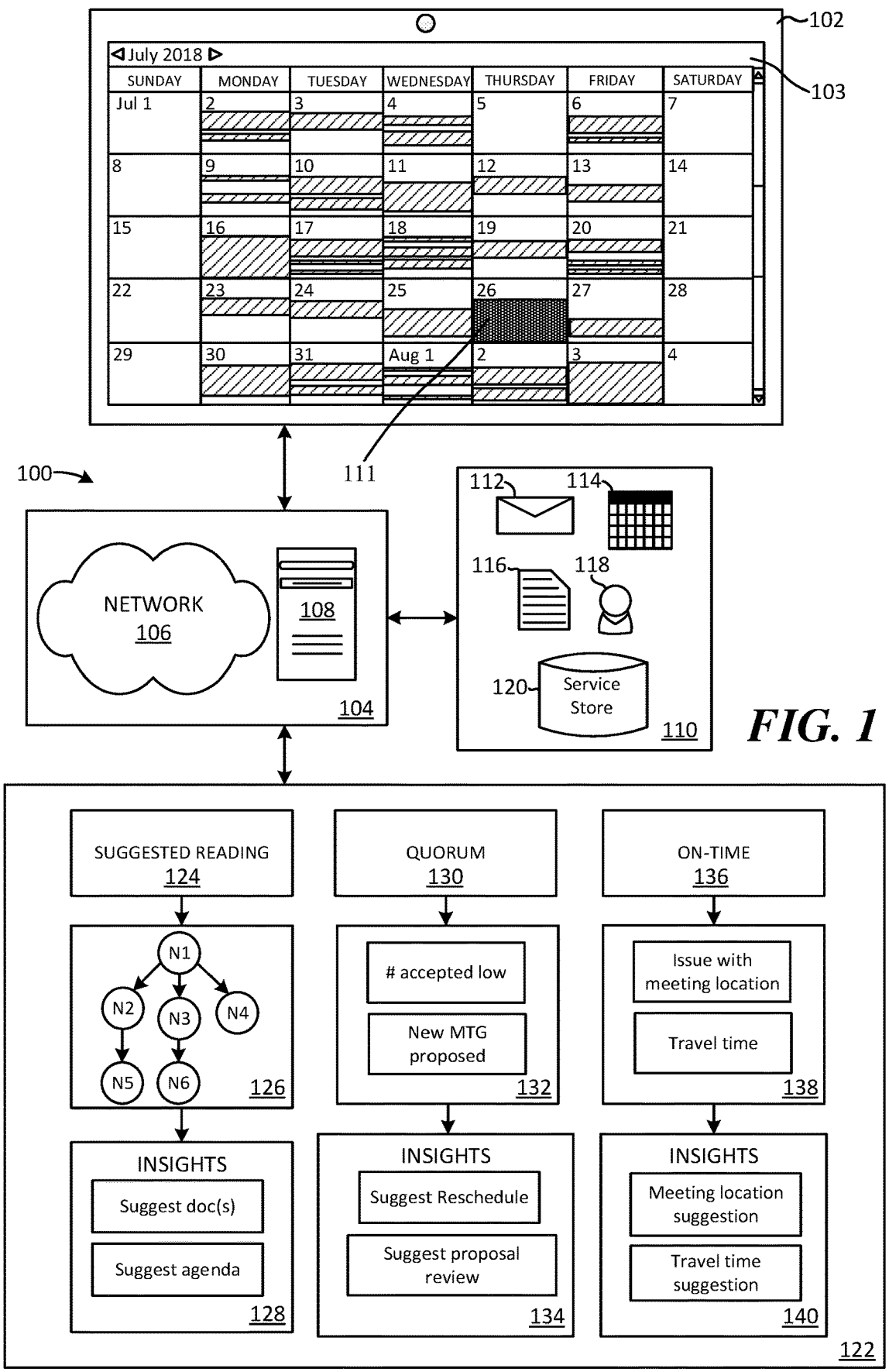
FIG. 1 is a schematic diagram illustrating an example distributed computing environment for providing meeting insights in relation to a meeting invitation.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for generating, surfacing, interacting with, and providing follow-up operations associated with meeting insights. According to examples, a first type of meeting insight may comprise one or more user interface elements that are associated with an electronic calendar event, and the one or more user interface elements may provide an indication of one or more resources (e.g., documents, meeting agendas) that a user (meeting invitee, meeting organizer) associated with the calendar event should read prior to the meeting. In some examples, the resources may be identified from a graphical matrix comprising a plurality of resources. A determination may be made based on the edges in that graph and the various attributes of the resources as to what extent they may relate to a meeting. In some examples, the edges in the graph may be explicit (e.g., resource attachments, embedded resource links, etc.). In other examples, the edges in a graph may be implied (e.g., based on attribute overlap, based on textual reference, etc.). In some examples, one or more natural language processing models and/or machine learning models may be applied to resources to determine whether they relate to a meeting (e.g., does a meeting invite contain a meeting agenda, is document relevant to a topic that will be discussed during the meeting). These meeting insights may be interacted with to surface and open suggested meeting pre-reads.

A second type of meeting insight may comprise one or more user interface elements that are associated with an electronic calendar event, and the one or more user interface elements may provide an indication that a number of invitees for the event that have accepted is below a threshold. The threshold may relate to a number of invitees that have accepted, declined and/or answered tentatively that they will attend a meeting. In some examples, when meeting attendance is determined to likely be relatively low based on the threshold, a meeting insight may be surfaced indicating the low attendance rate. The meeting insight may be interacted with to reschedule the meeting to increase the likelihood of a better attendance rate.

A third type of meeting insight may comprise one or more user interface elements that are associated with an electronic calendar event, and the one or more user interface elements may provide an indication that one or more event invitees have proposed a modification to the event time. In examples, the meeting insight may be interacted with to view the proposal and/or to reschedule the meeting.

A fourth type of meeting insight may comprise one or more user interface elements that are associated with an electronic calendar event, and the one or more user interface elements may indicate that a location is missing for holding the event. In some examples, the meeting insight may be interacted with to add a meeting location for the event. In examples, one or more locations may be intelligently suggested for the event based on identification of open conference rooms, past meeting scheduling, user preferences, etc.

A fifth type of meeting insight may comprise one or more user interface elements that are associated with an electronic calendar event, and the one or more user interface elements may provide an indication of a time it will take a corresponding organizer and/or invitee to travel from that user's current location to the event location. In some examples, the meeting insight may be interacted with to set a meeting reminder related to the estimated duration of travel time. In additional examples, the meting insight may be interacted with to automatically surface a maps application with directions populated from the user's current location to the meeting location.

The systems, methods, and devices described herein provide technical advantages for scheduling meetings, attending meetings, and performing follow-up actions associated with meetings. Processing costs (i.e., CPU cycles) are reduced via the mechanisms described herein at least in that documents and related meeting materials that are useful meeting pre-reads can be automatically identified rather than having a user perform various manual searches for those resources (e.g., email searches, file searches, cloud directory searches, etc.). Processing costs are also reduced via the mechanisms described herein in that remote meetings over computing devices that would be poorly attended due to a low meeting acceptance rate can be automatically rescheduled via interaction with a corresponding insight type.

FIG. 1 is a schematic diagram illustrating an example distributed computing environment 100 for providing meeting insights in relation to a meeting invitation. Computing environment 100 includes computing device 102, network and processing sub-environment 104, service store sub-environment 110, and insights sub-environment 122.

Network and processing sub-environment 104 includes network 106, by which any of the computing devices described herein may communicate with one another, and server computing device 108, which is exemplary of a cloud-computing device that may perform one or more operations described herein in relation to a cloud-based application service (e.g., a calendar application service and/or an insights application service, an email application service, a document application service, etc.).

Service store sub-environment 110 comprises service store 120, which contains information associated with a plurality of users' electronic calendar/scheduling applications, including documents 116, user information 118, past, present, and future calendar events 114, and meeting/event invitations 112 associated with past, present and future events. Documents 116 may include productivity application documents that are stored locally to a local computing device such as computing device 102 and/or one or more remote storage locations. Documents 116 may comprise one or more documents of one or more document types, including one or more of: emails, saved instant messages, word processing documents, presentation documents, spreadsheet documents, note application documents, etc. Server computing device 108 and an associated calendar/insights application service may communicate with service store 120 and obtain and analyze information included therein in performing one or more operations described herein.

In this example, a new meeting invitation has been received by the calendar/insights application service and new calendar event 111 corresponding to that meeting invitation has been added to electronic calendar 103. Electronic calendar 103 may be associated with one or more user accounts in service store 120 and/or the calendar/insights application service. According to examples, when a new meeting invitation is received by the calendar/insights application service it may be processed by one or more elements and/or application engines illustrated in relation to insights sub-environment 122.

Insights sub-environment 122 includes suggested reading processing flow 124, which includes resource graph processing element 126 and suggested reading insight output element 128. Insights sub-environment 122 further includes meeting quorum processing flow 130, which includes invitee response monitoring processing element 132 and quorum suggestion output element 134. Insights sub-environment 122 also includes on-time processing flow 136, which includes locational and temporal processing element 138 and locational and temporal output element 140.

Suggested reading processing flow 124 illustrates the processing of data to identify documents and/or resources that are useful for meeting attendees to read prior to the meeting. The determination of whether a document and/or resource may be related to, and therefore useful, for an attendee of a meeting to read prior to the meeting may comprise identifying links between nodes in a resource graph matrix, such as is illustrated by resource graph processing element 126 and as more fully described in relation to FIG. 4. In some examples, these links, or "edges" may be explicit (e.g., resource attachments, embedded resource links, etc.). In other examples, the edges in a graph may be implied (e.g., based on attribute overlap, based on textual reference, etc.). When documents and/or resources that are determined to be related to a meeting and/or meeting invitation, one or more selectable insight elements corresponding to those documents and/or resources may be surfaced in one or more applications in association with the meeting and/or meeting invitation (e.g., in an electronic calendar application). The insights may be surfaced in association with the meeting organizer's applications and/or the meeting invitees' applications. The selectable insight elements may be selected for opening those documents and/or resources on a computing device and/or setting a reminder to review those materials. The surfacing of the selectable insight elements, related documents and/or resources (e.g., attachments, related productivity documents, meeting agendas, suggested emails, messaging chats, notes, meeting transcription excerpts, etc.) is illustrated by suggested reading insight output element 128.

Meeting quorum processing flow 130 illustrates the processing of data to determine whether a threshold number, percentage and/or ratio of meeting invitees have failed to respond affirmatively to a meeting invite that they will attend the corresponding meeting, and the surfacing of one or more selectable insight elements for changing the meeting time if such a determination is made. Meeting quorum processing flow 130 also illustrates the processing of data to determine whether one or more invitees to a meeting have suggested that the meeting time be modified, and the surfacing of one or more selectable insight elements for changing the meeting time and/or responding to those invitees if such a determination is made. The selectable insight elements may be surfaced in one or more applications in association with the meeting and/or meeting invitation (e.g., in an electronic calendar application). The insights may be surfaced in association with the meeting organizer's applications and/or the meeting invitees' applications. With regard to the threshold number, percentage and/or ratio of invitees that have accepted a meeting invitation, the threshold value may be modifiable (e.g., by the organizer, by the developer). Additionally, invitee responses to a meeting invite of "tentative" may also be included in the determination of whether to surface an insight corresponding to a suggested rescheduling of the meeting. The processing of the data to determine whether the threshold value has been met and/or whether an invitee has proposed a meeting time modification is illustrated by invitee response monitoring processing element 132 and is more fully described in relation to FIG. 3. The surfacing of the selectable insight elements related to meeting rescheduling suggestions and/or generation of automatic messages for responding to an invitee that has proposed a meeting time modification is illustrated by quorum suggestion output element 134.

On-time processing flow 136 illustrates the processing of data to determine whether there is an issue with a meeting location included (or not included) in a meeting invitation, and the surfacing of one or more selectable insight elements for remedying meeting location issues. On-time processing flow 136 also illustrates the processing of data to determine an estimated duration of time it will take a meeting attendee to travel from the attendee's location to the meeting location, the surfacing of a reminder for the meeting that takes into account that estimated duration of travel time, and/or the automatic opening and population of a map application with directions for traveling to the meeting. In examples, if a determination is made that there is no meeting location associated with a meeting invite and/or there is an issue with a meeting location included in a meeting invite (e.g., a conference room is booked, a meeting location is closed during a proposed meeting time, etc.), one or more selectable meeting insights may be surfaced in one or more applications associated with the meeting organizer and/or a meeting invitee. In additional examples, when a determination is made as to an estimated duration of time that it will take an attendee to travel from the attendee's location to a meeting location, one or more selectable meeting insights for adding a meeting reminder/alarm that takes into account the estimated travel time may be surfaced and/or a selectable insight for automatically opening and populating a maps application with the attendee's location and the meeting location may be surfaced in one or more applications. The processing of data related to the meeting location issues and/or estimated duration of travel time to a meeting is illustrated by locational and temporal processing element 138, and the surfacing of selectable insight elements related to the meeting location issues and/or estimated duration of travel time to a meeting is illustrated by locational and temporal output element 140. Additional details regarding the surfacing of insights related to the estimated duration of travel time to a meeting are provided in relation to FIG. 5 and FIG. 6.

Figure 2:
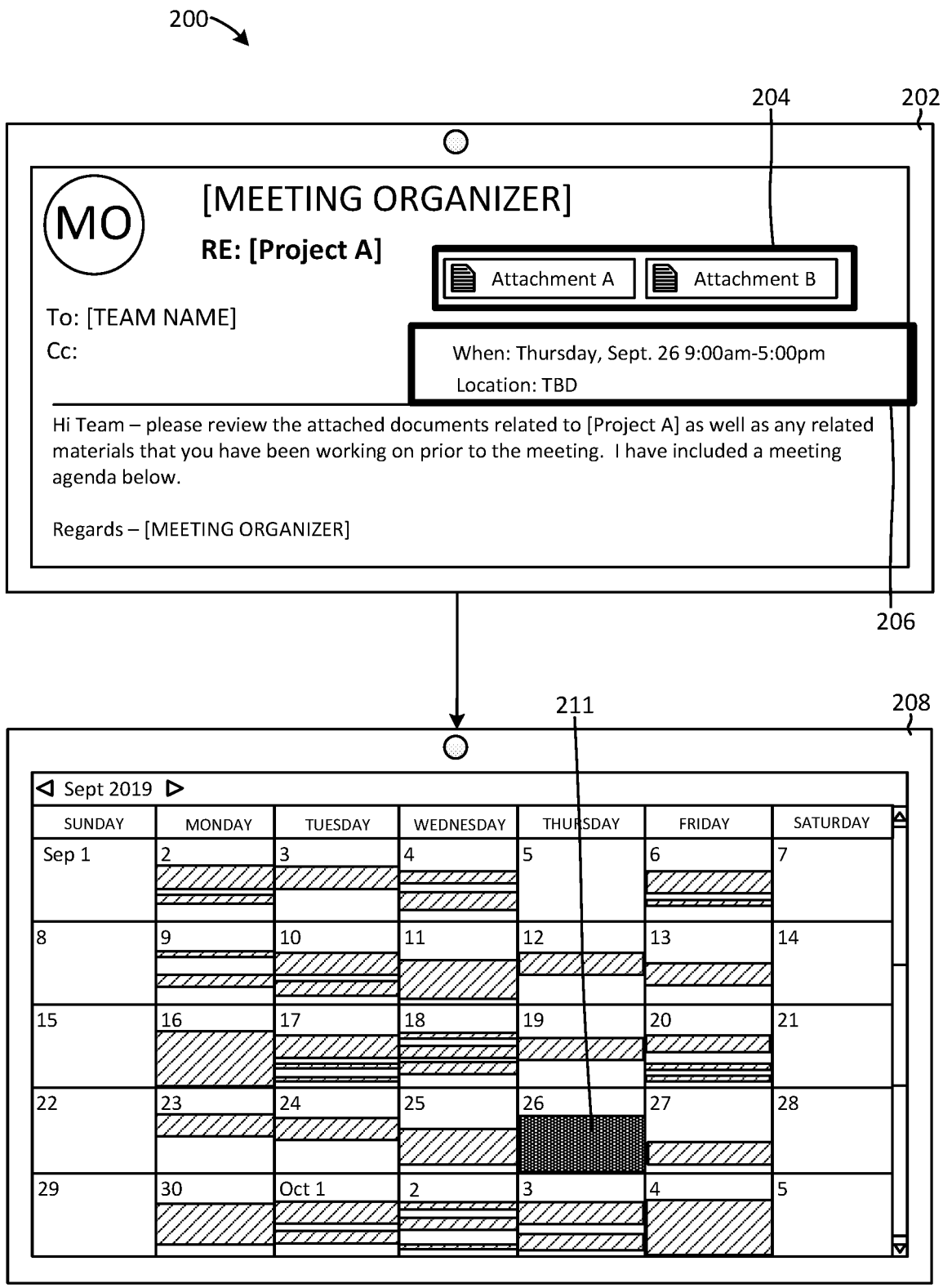
FIG. 2 illustrates a computing environment including a received meeting invite for a meeting that will be utilized to provide meeting insights in relation to a user's electronic calendar.

FIG. 2 illustrates a computing environment 200 including a received meeting invite for a meeting that will be utilized to provide meeting insights in relation to a user's electronic calendar. Computing environment 200 includes computing device 202 and computing device 208, which may be the same or different computing devices. Computing device 202 displays an electronic meeting invite that has been sent from a meeting organizer to a group of invitees corresponding to [TEAM NAME]. The body of the electronic meeting invite states: "Hi Team—please review the attached documents related to [Project A] as well as any related materials that you have been working on prior to the meeting. I have included a meeting agenda below. Regards—[MEETING ORGANIZER]." Although not shown, below the body of the email there is a meeting agenda included with the electronic meeting invite. There are two attachments 204 to the electronic meeting invite. There is also time and location information 206 included for the meeting. The time of the meeting is set for Thursday, September 26 from 9:00 am-5:00 pm, and the location is to-be-determined "TBD". Computing device 208 depicts a calendar application user interface associated with the meeting organizer or one of the invitees, with meeting element 211 corresponding to the meeting invite blocked off on the Thursday, September 26 display calendar element.

Figure 3:
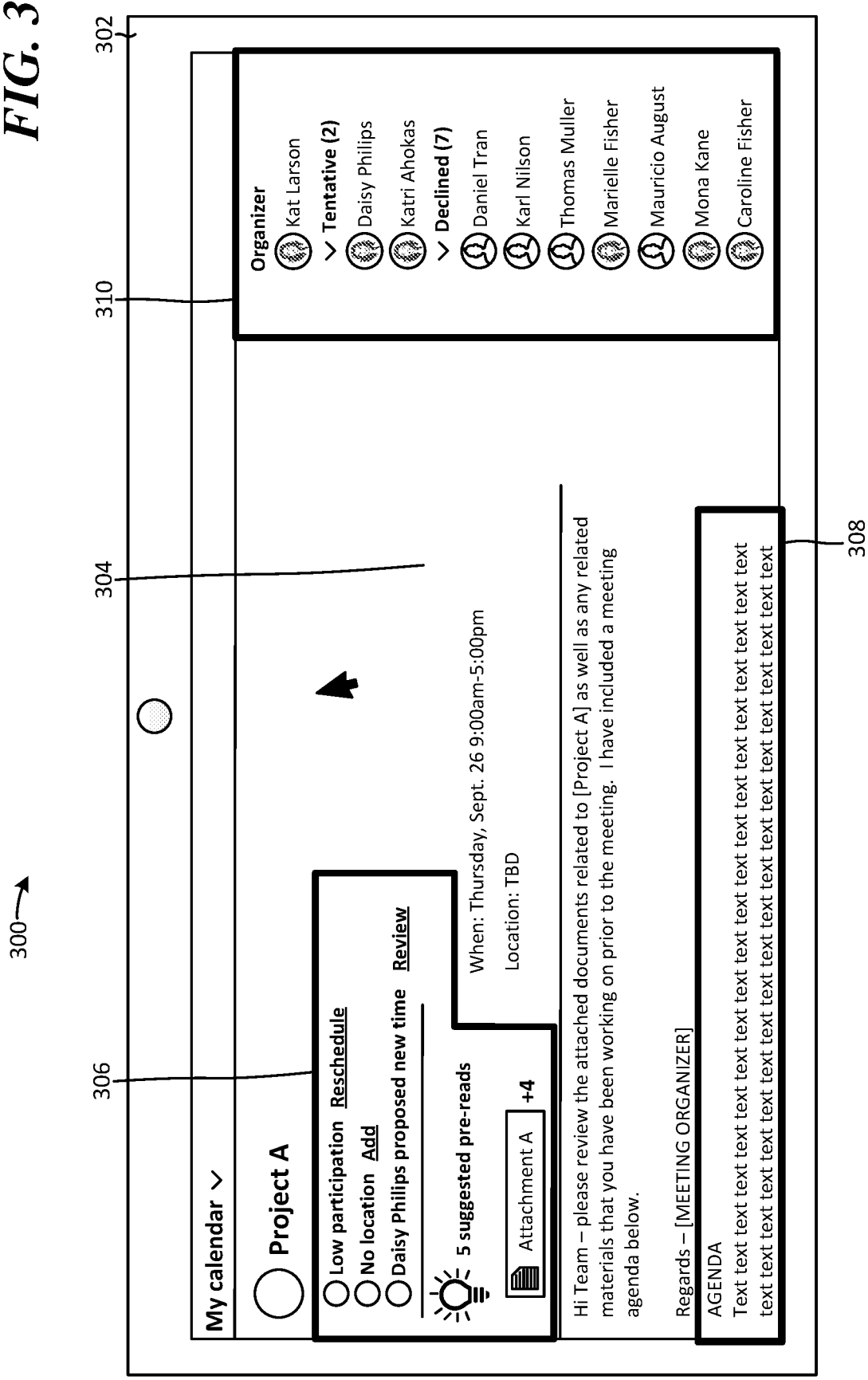
FIG. 3 illustrates a computing environment including an electronic calendar event user interface for providing meeting insights related to a meeting invitation.

FIG. 3 illustrates a computing environment 300 including an electronic calendar event user interface for providing meeting insights related to a meeting invitation. Computing environment 300 includes computing device 302 which displays information in a meeting user interface 304 related to the electronic meeting invite discussed above in relation to FIG. 2. For example, the meeting organizer or an attendee may have interacted with meeting element 211 in FIG. 2, and meeting user interface 304 may be subsequently displayed. In examples, one or more of the elements depicted on meeting user interface 304 may be included only on a meeting organizer's view of a meeting (e.g., low participation insights, no location insights, new time proposal insights, etc. may be included on an organizer's view of a meeting and not on an attendee's view of a meeting). In other examples, each of the elements depicted on meeting user interface 304 may be included on both the organizer's user interface view of a meeting and an invitee's user interface view of a meeting. More or fewer meeting insight elements may be included on a meeting user interface, and different arrangements and specific user interface configurations for displaying meeting insight elements are contemplated than are shown in relation to FIG. 3.

Meeting user interface 304 includes the title/subject of the meeting "Project A", the body of the content of the meeting invite, including the meeting agenda referenced above in relation to FIG. 2, an attendance display element 310, which depicts a user icon corresponding to the organizer (Kat Larson), and user icons corresponding to each of the invitees in relation to their type of response to the meeting invite (e.g., "Tentative", "Declined", and although not shown—"Have not responded" and "Accepted"). In this example, attendance display element 310 indicates that two invitees (Daisy Philips, Katri Ahokas) have responded to the meeting invite as "Tentative", and seven invitees (Daniel Tran, Karl Nilson, Thomas Muller, Marielle Fisher, Mauricio August, Mona Kane, Caroline Fisher) have responded to the meeting invite as "Declined".

Also included in user interface 304 are selectable meeting insight elements 306. Selectable meeting insight elements 306 include: a low participation insight element, a no location element, a proposed new time element, and a suggested pre-reads element.

The low participation insight element may be surfaced in response to the calendar/insights application and/or service making a determination that a threshold number, ratio and/or percentage of invitees have not accepted the meeting invite. The low participation insight element may be selected/interacted with to reschedule the meeting. For example, if the "Reschedule" link in the low participation insight element is selected, a meeting rescheduling user interface may be automatically opened, with one or more elements corresponding to the meeting automatically being populated (e.g., invitees, location, meeting invite body/agenda, attachments, etc.).

The no location insight element may be surfaced in response to the calendar/insights application and/or service making a determination that there is was no location included in the meeting invite. The no location insight element may be selected/interacted with to add a location for the meeting. In some examples, if the "Add" link in the no location insight element is selected, a user interface for adding a location for the meeting may automatically be opened. In some examples, the add location user interface may include suggested locations for the meeting based on one or more of: conference rooms that are open during the meeting time, organizer and/or invitee location preference based on past meeting history, etc.

The proposed new time insight element may be surfaced in response to the calendar/insights application and/or service making a determination that an invitee of the meeting has electronically proposed a new time for holding the meeting. The proposed new time insight element may be selected/interacted with to view the proposal and decline or accept it. In some examples, if the "Review" link in the proposed new time insight element is selected, a user interface for viewing and accepting or declining the proposed new time for the meeting may automatically be opened.

Figure 4:
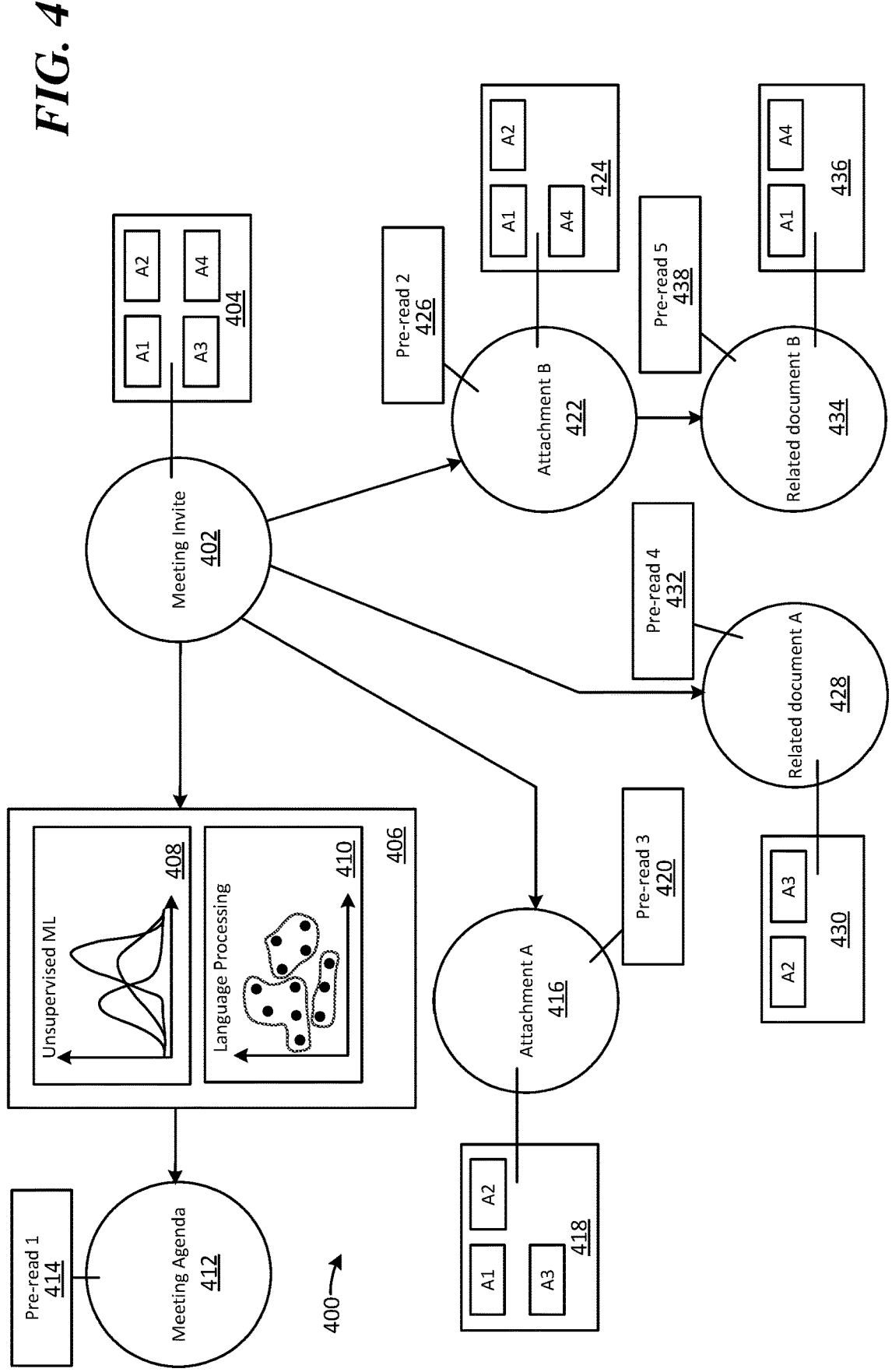
FIG. 4 illustrates a computing environment for node processing in a graphical matrix for providing meeting insights and recommending meeting pre-reads.

FIG. 4 illustrates a computing environment 400 for node processing in a graphical matrix for providing meeting insights and recommending meeting pre-reads. This discussion in relation to computing environment 400 continues with description of the subject matter and examples described above in relation to FIG. 1, FIG. 2 and FIG. 3. Computing environment 400 depicts a portion of a graphical matrix comprising a plurality of resources (e.g., application documents, emails, saved instant message conversations, notes, etc.), which digitally connects resources to one another based on one or more attributes of those resources. Computing environment 400 also depicts the processing of one or more resources (in this case the original meeting invite 402) to determine whether a meeting agenda has been associated with an electronic meeting invite. In some examples, values for each of a plurality of resources in the graphical matrix may be calculated as relating to original meeting invite 402 and/or one or more other resources in the graph, and a determination may be made based on those values as to whether to include those resources as suggested pre-reads associated with meeting insights for that meeting.

Computing environment 400 and the depicted graphical matrix includes meeting invite resource 402 with corresponding attributes (A1, A2, A3, A4) 404; meeting agenda resource 412, which is illustrated as being a suggested pre-read in relation to pre-read 1 element 414; natural language processing and machine learning element 406; attachment A resource 416 with corresponding attributes (A1, A2, A3) 418, which is illustrated as being a suggested pre-read in relation to pre-read 3 element 420; attachment B resource 422 with corresponding attributes (A1, A2, A4) 424, which is illustrated as being a suggested pre-read in relation to pre-read 2 element 426; related document A resource 428 with corresponding attributes (A2, A3) 430, which is illustrated as being a suggested pre-read in relation to pre-read 4 element 432; and related document B resource 434 with corresponding attributes (A1, A4) 436, which is illustrated as being a suggested pre-read in relation to pre-read 5 element 438.

According to examples, attributes may be associated with each of the resources in the graphical matrix. The attributes may correspond to: time of creation and/or last edit; type of resource; content type; resource attachments (i.e., what other resources is a resource attached to); actual content; creators; modifiers; interaction history; and importance, for example. For example, attribute A1 may correspond to a time and/or date of resource creation and/or last edit, attribute A2 may correspond to a type of resource (e.g., word processing document, email document, presentation document, spreadsheet document, notes document, etc.), attribute A3 may correspond to a content type and/or classification of resource (e.g., relates to topic A, relates to topic B), and attribute A4 may correspond to whether a resource is directly attached to an electronic meeting invite. A determination may thus be made based on attribute overlap amongst resources and/or based on the level of connectedness (e.g., first level from meeting invite resource 402, second level removed from meeting invite resource 402, etc.) as to whether to include a resource as a suggested pre-read meeting insight for a given meeting.

According to examples, one or more resources that have been determined to relate to a meeting invite may be further processed to determine whether they correspond to a meeting agenda. In this example, the original meeting invite 402 (i.e., the content included in the meeting invite) is processed by one or more machine learning models and/or natural language processing models as illustrated by natural language processing and machine learning element 406 to determine whether a meeting agenda is included in that invite. For example, language clustering models may be applied to text in a resource to determine whether a resource exceeds a threshold value for corresponding to a meeting agenda. In another example, a neural network may be applied to a resource, or portions thereof, to determine whether it should be classified as a meeting agenda. Once classified as a meeting agenda, a resource may be associated with a meeting in an electronic calendar application as a suggested pre-read meeting insight that can be interacted with and surfaced via selection of that insight.

Figure 5:
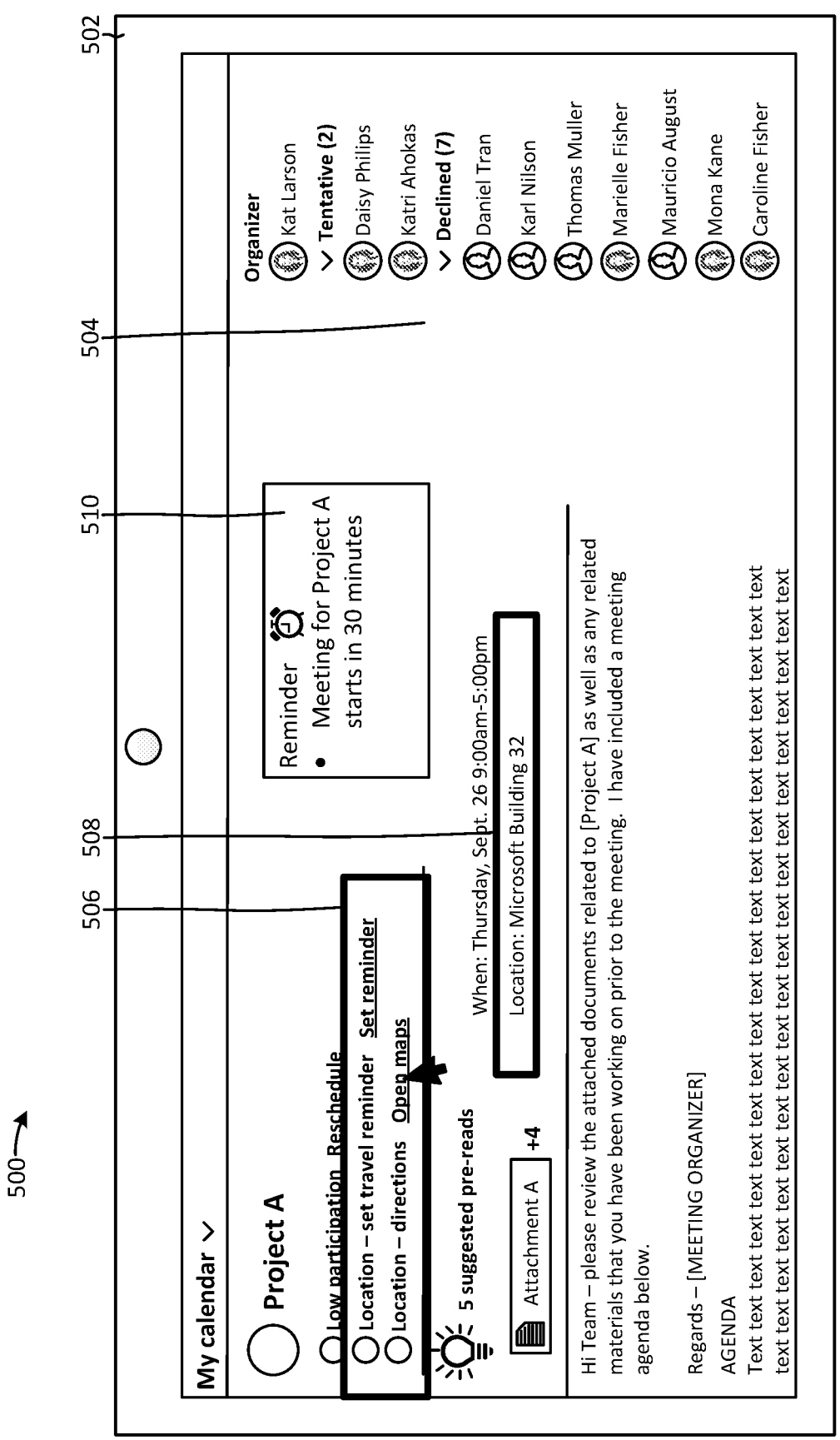
FIG. 5 illustrates a computing environment including another electronic calendar event user interface for providing meeting insights related to a meeting invitation.

FIG. 5 illustrates a computing environment 500 including another electronic calendar event user interface 504 for providing meeting insights related to a meeting invitation. Computing environment 500 includes computing device 502 which displays information in a meeting user interface 504 related to an electronic meeting invite. More or fewer meeting insight elements may be included on a meeting user interface, and different arrangements and specific user interface configurations for displaying meeting insight elements are contemplated than are shown in relation to FIG. 5.

Meeting user interface 504 includes the title/subject of the meeting "Project A", the body of the content of the meeting invite, including a meeting agenda, an attendance display element, which depicts a user icon corresponding to the organizer, and user icons corresponding to each of the invitees in relation to their response types to the meeting invite (e.g., "Tentative", "Declined", and although not shown—"Have not responded" and "Accepted").

Also included in user interface 504 is location 508 for the meeting—which is displayed as: "Location: Microsoft Building 32". There are two selectable location meeting insights 506 related to the location included on the user interface 504. A first location meeting insight is selectable for setting a travel reminder and/or a meeting reminder for the meeting corresponding to an estimated duration of time that it will take the meeting attendee to travel from the attendee's location to the meeting location. For example, if the meeting attendee selects the first location meeting insight corresponding to that travel/meeting reminder, a pop-up window, such as pop-up window 510 may be triggered to be surfaced a threshold duration of time before or corresponding to the estimated duration of time that it will take that attendee to travel to the meeting location (e.g., the reminder may be surfaced 10, 15, 20 minutes prior to the time that the attendee should leave her current location to make it to the meeting based on the estimated duration of time it will take the attendee to make it to the meeting location).

A second location meeting insight is selectable for opening a maps application that may be automatically populated with the selecting attendee's current location and the meeting location's geo-coordinates. Additional detail related to selection of this meeting insight are provided in relation to FIG. 6.

Figure 6:
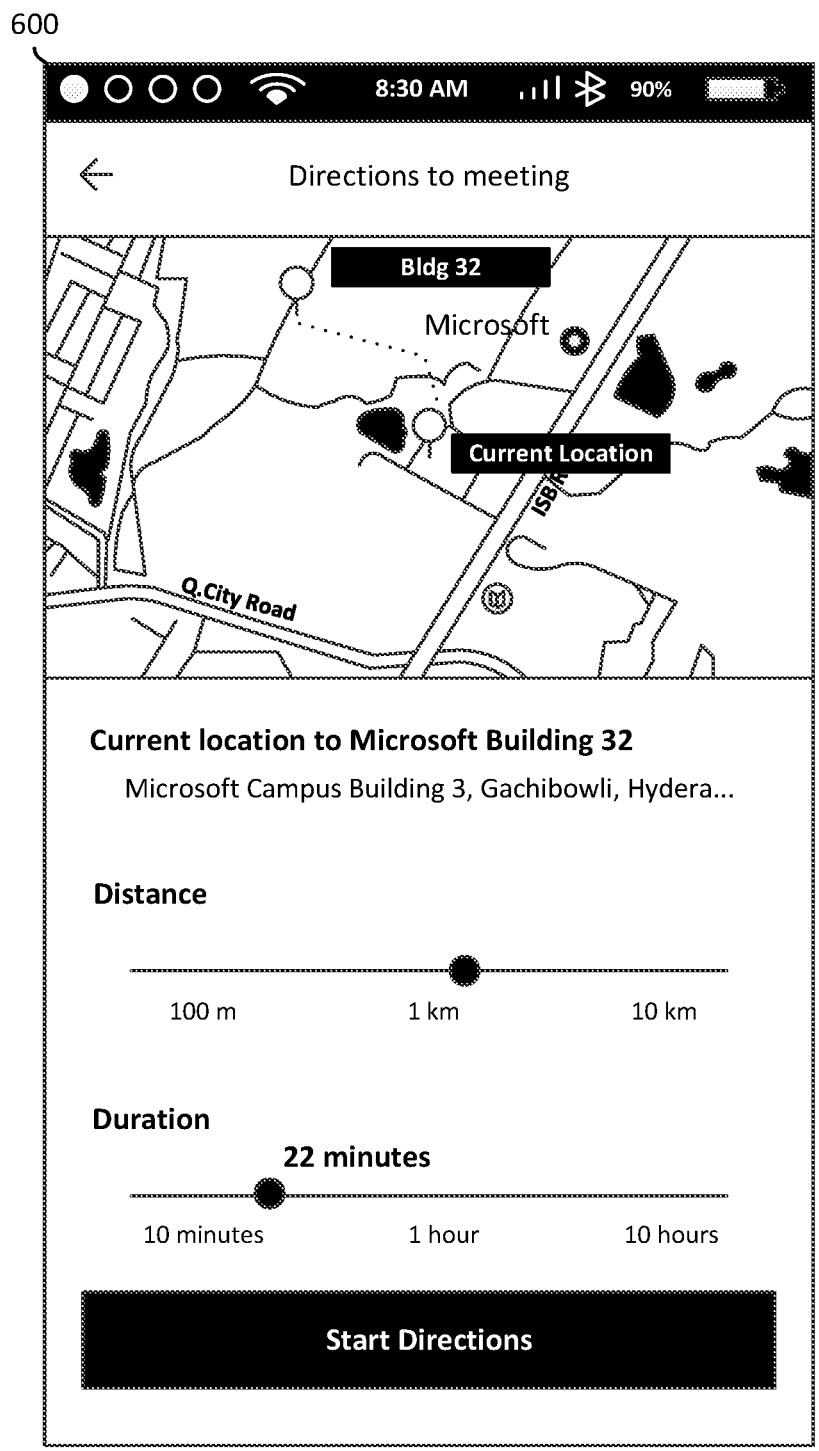
FIG. 6 illustrates a map application user interface that has been opened based on selection of a user interface element on the calendar event user interface of FIG. 5.

FIG. 6 illustrates a map application user interface 600 that has been opened based on selection of a user interface element on the calendar event user interface of FIG. 5. Specifically, a selection of the "Open maps" insight element has been made from the user interface 504 of FIG. 5—although other user interface configurations and selection mechanisms corresponding to this insight are contemplated as should be well understood by those of skill in the art (e.g., different UI locations for the insight, different names for the selectable element corresponding to the insight, etc.). Regardless, when the insight element is selected, the map application user interface 600 is opened and surfaced by the selecting user's computing device and pre-populated with the device's current location as the starting location and the meeting's location as the ending point. The user may then utilize the maps application to navigate to the meeting.

Figure 7:
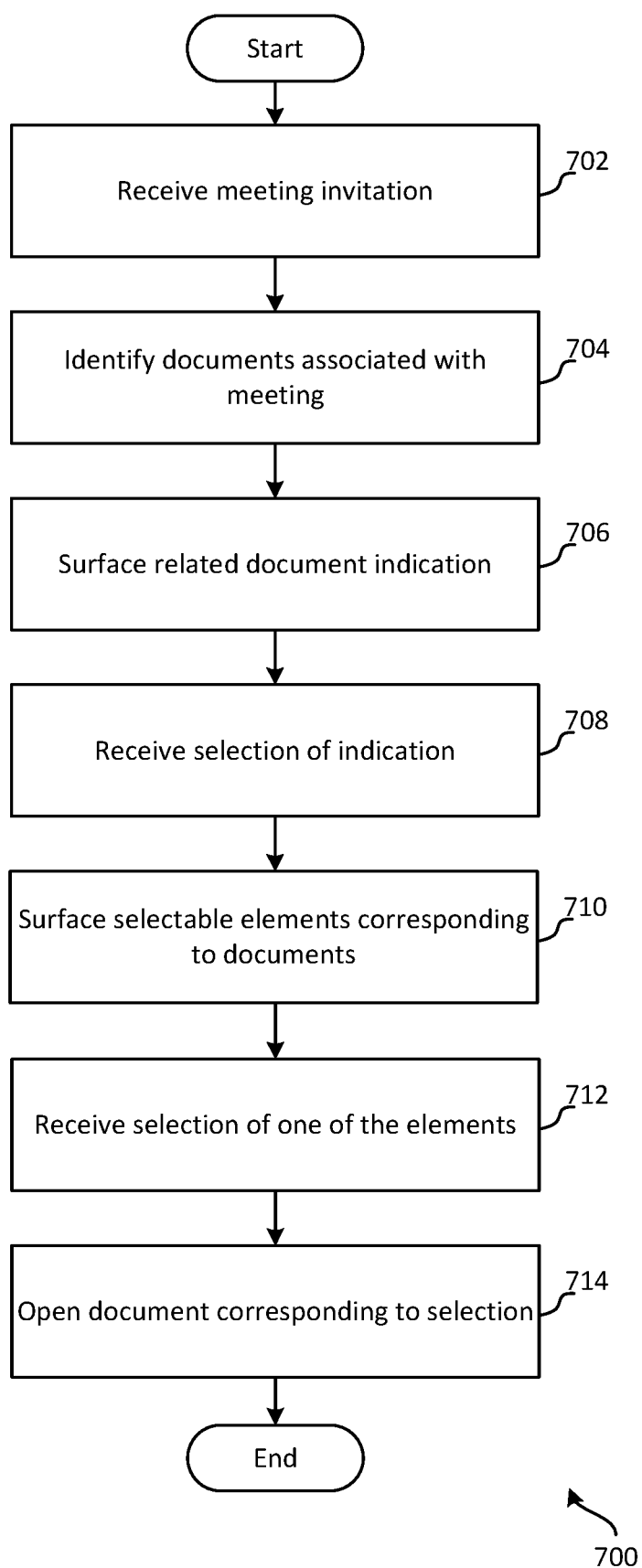
FIG. 7 is an exemplary method for providing meeting insights related to recommended meeting pre-reads.

FIG. 7 is an exemplary method 700 for providing meeting insights related to recommended meeting pre-reads. The method 700 begins at a start operation and flow continues to operation 702.

At operation 702 an electronic invitation for a meeting that includes a plurality of invitees is received.

From operation 702 flow continues to operation 704 where a plurality of electronic documents associated with the meeting are identified. In examples, the electronic documents may comprise one or more of: email attachments, related productivity documents, meeting agendas, suggested emails, messaging chats, notes, and/or meeting transcription excerpts, among other resources discussed herein. According to examples, the plurality of electronic documents may be identified based on attributes that are shared with the meeting invite. The shared attributes may relate to, for example, a time of creation or last time of editing, a subject, a content type, one or more authoring and/or editing user identities, a save location, etc. In some examples, a determination may be made at operation 704 as to whether a meeting agenda exists for the meeting. The determination may be made based on processing of content corresponding to the meeting invite itself and/or one or more resources that have been determined to relate to the meeting invite. The processing may comprise application of one or more natural language processing models and/or machine learning models to the meeting invite and/or documents/resources associated with the meeting invite.

From operation 704 flow continues to operation 706 where an indication comprising a selectable user interface element that there are one or more electronic documents associated with the meeting is surfaced on a user interface of an electronic calendar of one of the meeting invitees. According to examples, only documents that have been determined to be associated with the meeting invite based on a determined association value may be surfaced. For example, a value may be calculated for each node in a graphical resource matrix that each resource node is related to a meeting invitation node and only resources/nodes that have values calculated for them that reach a minimum threshold may be surfaced as selectable meeting insights. In some examples, to conserve processing resources, only nodes within a specified number of layers from the meeting invitation may be analyzed to determine whether those nodes relate to a meeting invite (e.g., one layer from a meeting invite node, two layers from a meeting invite node, etc.).

From operation 706 flow continues to operation 708 where a selection of the selectable user interface element is received. The selection may comprise a click from a mouse, a touch on a touchscreen, a verbal input, etc.

From operation 708 flow continues to operation 710 where selectable elements corresponding to each of the associated electronic documents are surfaced in the user interface of the electronic calendar. In other examples, the selectable elements may be surfaced in other applications and/or via pop-up windows or similar UI constructs in the operating system.

From operation 710 flow continues to operation 712 where a selection of one of the selectable document elements is received.

From operation 712 flow continues to operation 714 where an electronic document corresponding to the selected document element is opened.

From operation 714 flow moves to an end operation and the method 700 ends.

Figure 8:
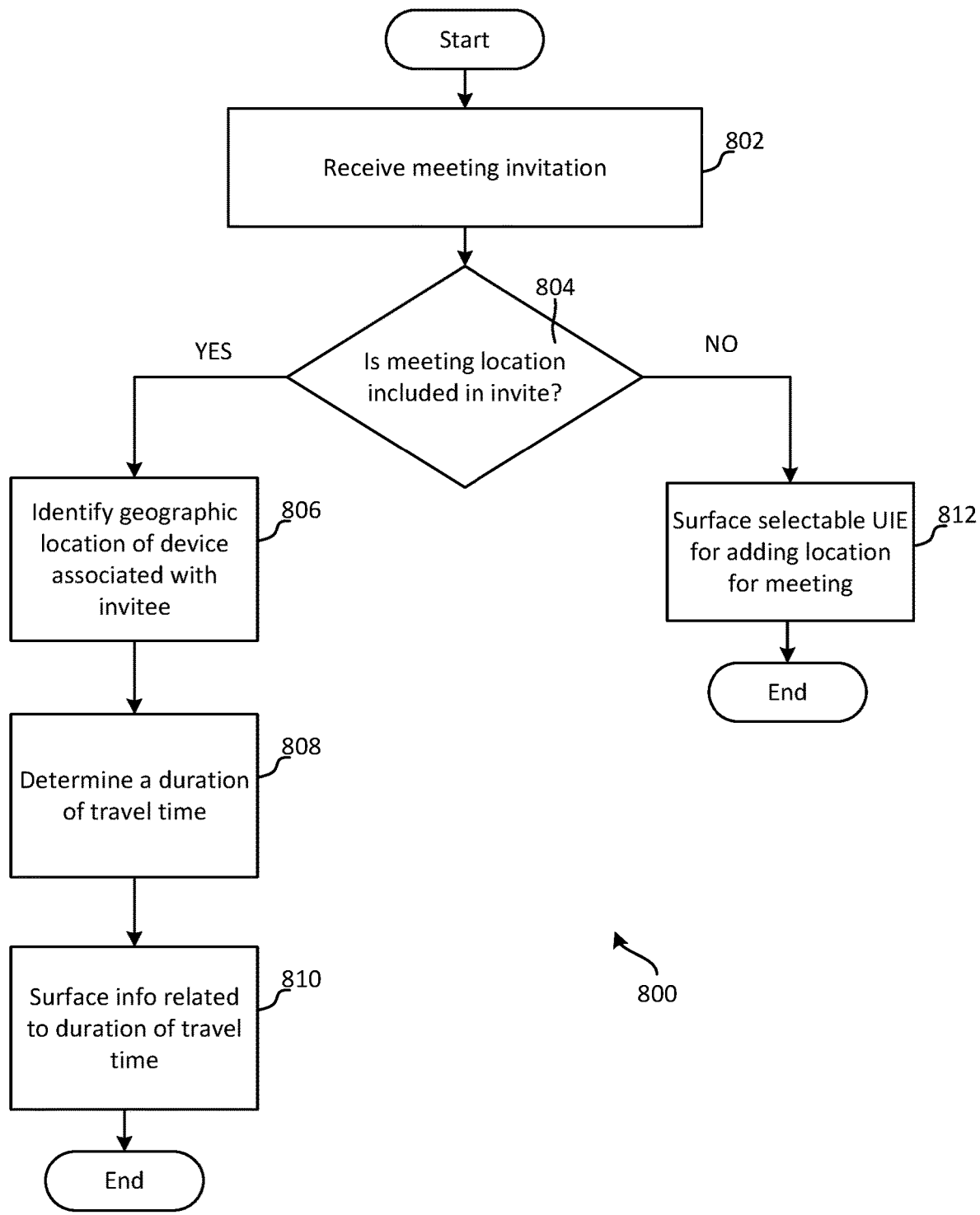
FIG. 8 is an exemplary method for providing meeting insights related to a meeting location.

FIG. 8 is an exemplary method 800 for providing meeting insights related to a meeting location. The method 800 begins at a start operation and flow continues to operation 802.

At operation 802 an electronic meeting invitation that includes a plurality of invitees is received.

From operation 802 flow continues to operation 804 where a determination is made as to whether there is a meeting location included in the meeting invitation. If a determination is made there is no meeting location included in the meeting invitation flow moves to operation 812. If a determination is made that there is a meeting location included in the meeting invitation flow moves to operation 806.

At operation 812, if a determination was made at operation 804 that there is no meeting location included in the meeting invitation, a selectable user interface element for adding a location for the meeting is surfaced in an electronic calendar user interface associated with a meeting organizer of the meeting.

From operation 812 flow moves to an end operation and the method 800 ends.

Alternatively, at operation 806, if a determination was made at operation 804 that there is a meeting location included in the meeting invitation, a geographic location of a computing device associated with an invitee of the meeting is identified.

From operation 806 flow continues to operation 808 where a determination is made of a time that it will take the invitee to travel from the invitee's identified geographic location to the meeting.

From operation 808 flow continues to operation 810 where information corresponding to the duration of time that it will take the invitee to travel from the invitee's identified geographic location to the meeting location is surfaced on a user interface of the computing device associated with the invitee of the meeting.

From operation 810 flow moves to an end operation and the method 800 ends.

Figure 9:
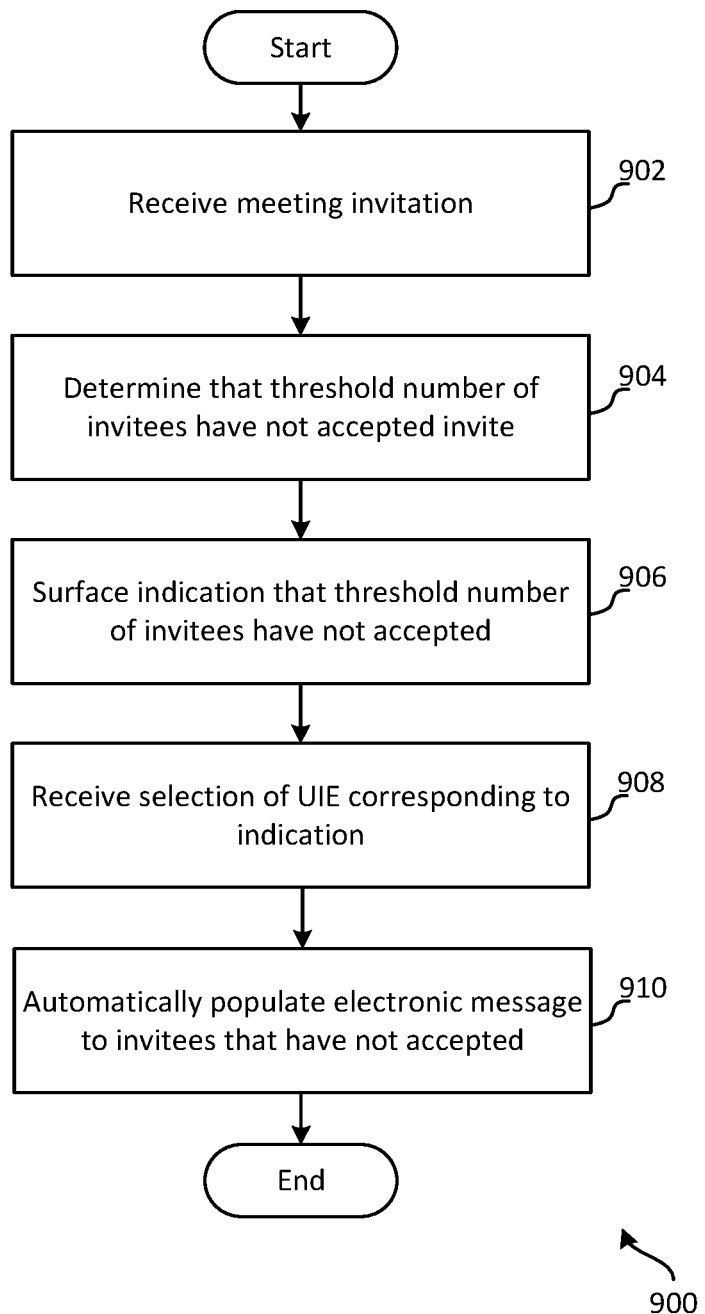
FIG. 9 is an exemplary method for providing meeting insights related to a meeting quorum.

FIG. 9 is an exemplary method 900 for providing meeting insights related to a meeting quorum. The method 900 begins at a start operation and flow moves to operation 902.

At operation 902 an electronic meeting invitation that includes a plurality of invitees is received.

From operation 902 flow continues to operation 904 where a determination is made that a threshold number of the plurality of invitees have not accepted the electronic invitation for the meeting is made. The threshold number may relate to a number of invitees that have accepted the meeting invite, declined the meeting invite, and/or answered the meeting invite tentatively. In some examples, the threshold may relate to a number, a ratio, and/or a percentage of invitees.

From operation 904 flow continues to operation 906 where an indication comprising a selectable user interface element that the threshold number of the plurality of invitees have not accepted the electronic invitation for the meeting is surfaced on a user interface of an electronic calendar and/or a user interface associated with the electronic calendar of the meeting organizer.

From operation 906 flow continues to operation 908 where a selection of the selectable user interface element that was surfaced is received.

From operation 908 flow continues to operation 910 where an electronic message corresponding to each of the invitees that have not accepted the electronic invitation for the meeting is automatically populated. In other examples, a separate electronic message for each of the invitees that have not accepted may be populated.

From operation 910 flow moves to an end operation and the method 900 ends.

Figure 10:
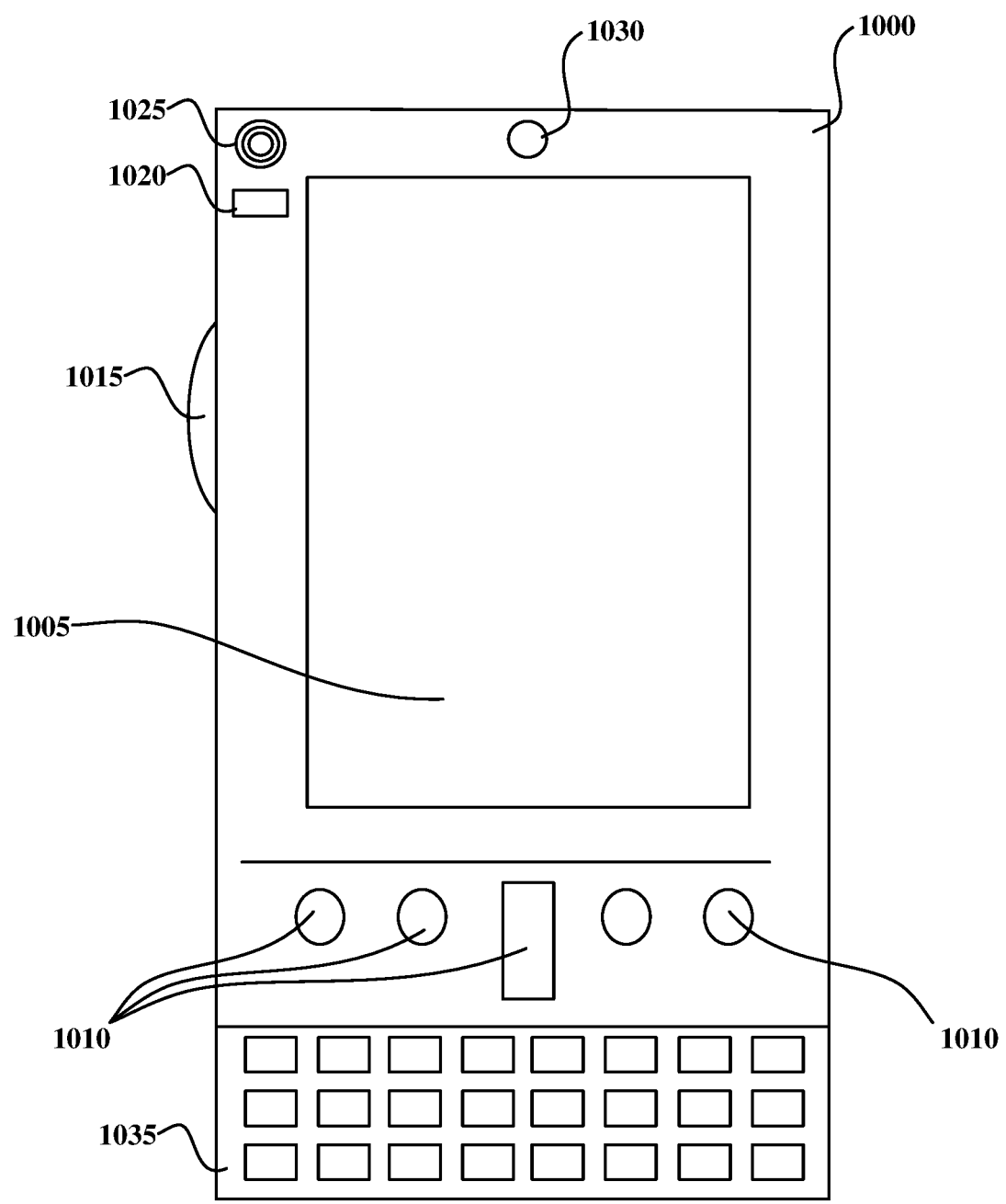
FIGS. 10 and 11 are simplified diagrams of a mobile computing device with which aspects of the disclosure may be practiced.
Figure 11:
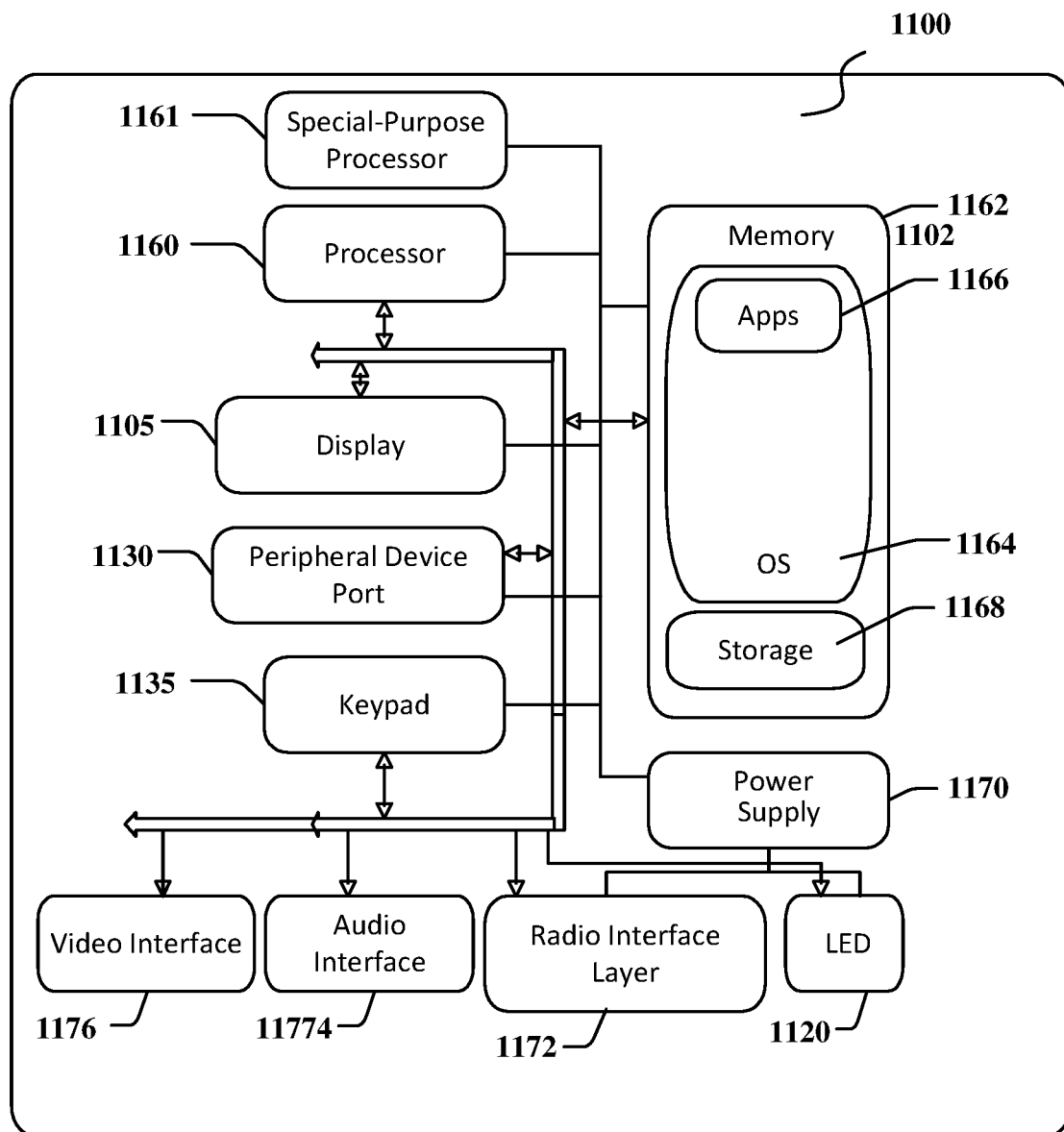

FIGS. 10 and 11 illustrate a mobile computing device 1000, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or fewer input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 11 is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including instructions for providing and operating a digital assistant computing platform.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 702 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1020 may be used to provide visual notifications, and/or an audio interface 1174 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1030 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
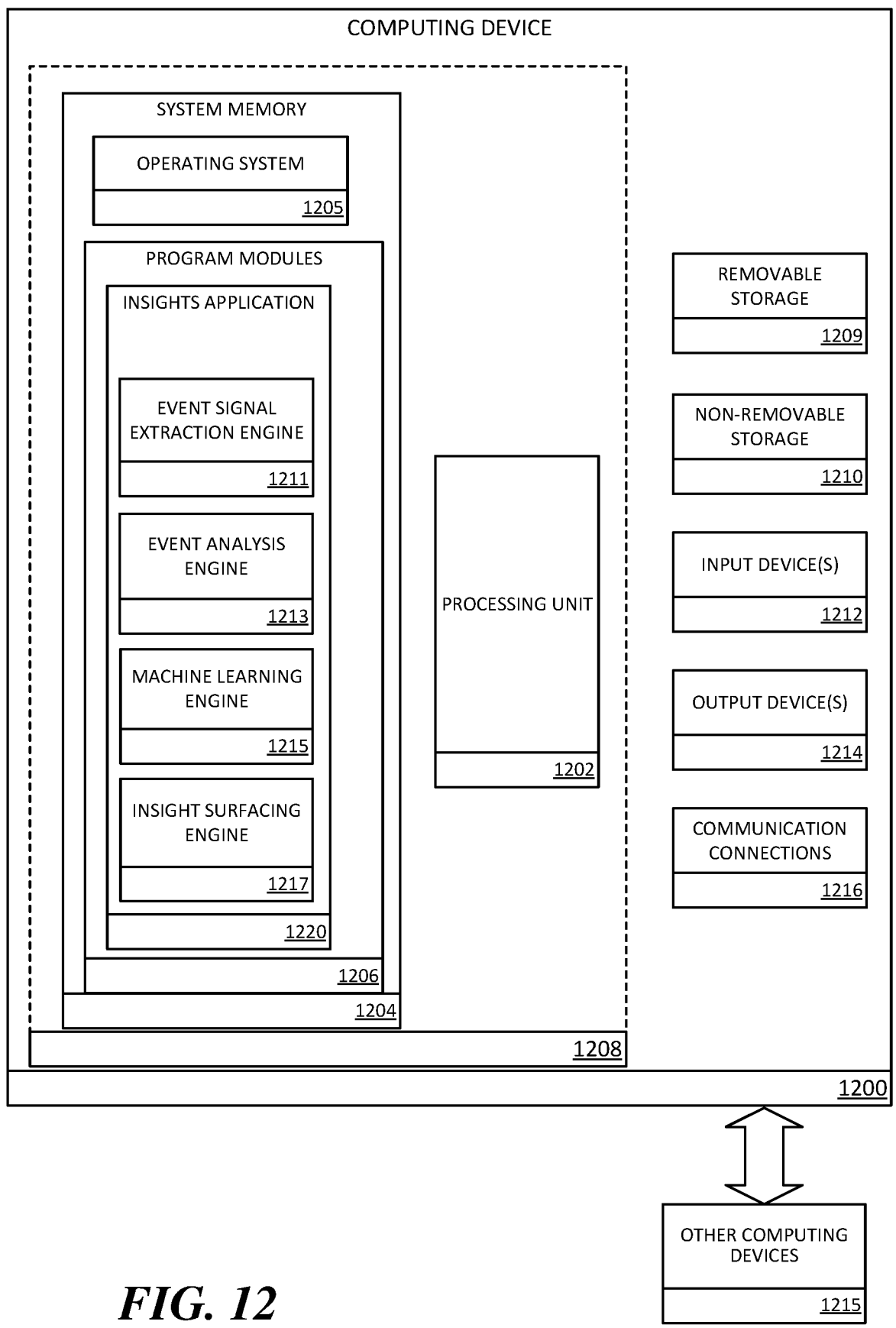
FIG. 12 is a block diagram illustrating example physical components of a computing device with which aspects of the disclosure may be practiced.

FIG. 12 is a block diagram illustrating physical components (e.g., hardware) of a computing device 1200 with which aspects of the disclosure may be practiced. The computing device components described below may have computer executable instructions for generating, surfacing and providing operations associated with meeting insights. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 suitable for running one or more digital assistant programs.

The operating system 1205, for example, may be suitable for controlling the operation of the computing device 1200. Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., insights application 1220) may perform processes including, but not limited to, the aspects, as described herein. According to examples, the event signal extraction engine 1211 may perform one or more operations associated with identifying one or more signals associated with events and/or event invitations. The event analysis engine 1213 may perform one or more operations associated with determining whether one or more resources are associated with one another and/or with one or more meetings based on analysis of one or more shared signals. The machine learning engine 1215 may perform one or more operations associated with applying one or more machine learning models to one or more resources to determine whether they include content relevant to a meeting and/or whether a meeting invite includes a meeting agenda. The insights surfacing engine 1217 may perform one or more operations associated with surfacing insights in association with electronic calendar events and providing follow-up actions when interactions with those insights are received.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13:
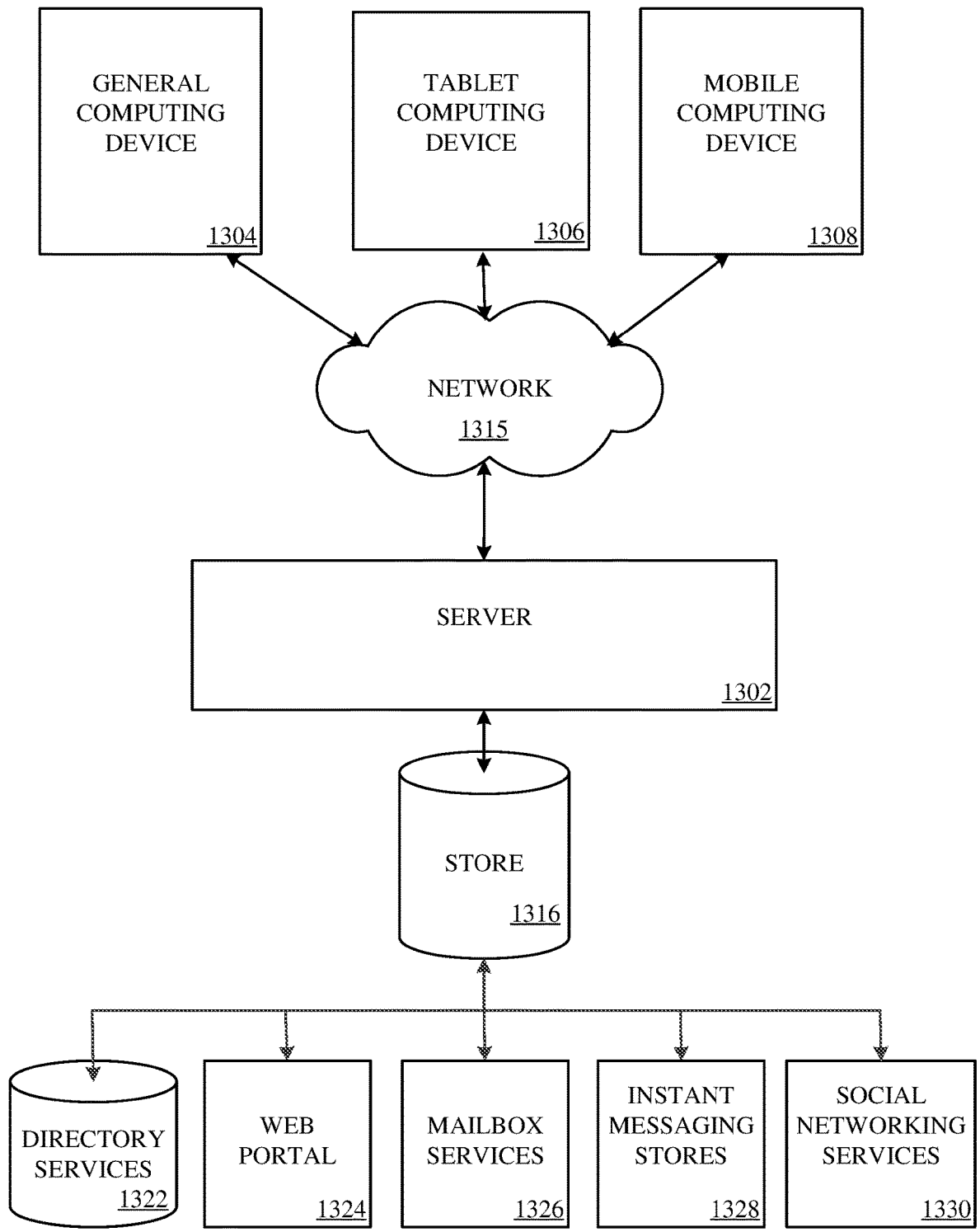
FIG. 13 is a simplified block diagram of a distributed computing system in which aspects of the present disclosure may be practiced.

FIG. 13 illustrates one aspect of the architecture of a system for processing data received at a computing system from a remote source, such as a personal/general computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The program modules 1206 may be employed by a client that communicates with server device 1302, and/or the program modules 1206 may be employed by server device 1302. The server device 1302 may provide data to and from a client computing device such as a personal/general computer 1304, a tablet computing device 1306 and/or a mobile computing device 1308 (e.g., a smart phone) through a network 1315. By way of example, the computer systems described herein may be embodied in a personal/general computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for providing meeting insights, the method comprising:
   receiving an electronic invitation for a meeting, wherein there are a plurality of invitees included in the electronic invitation;
   accessing a plurality of related electronic documents comprised in a plurality of layers from the electronic invitation for the meeting in a data structure comprised of resources connected by explicit and implicit edges;
   processing only a set of the electronic documents that are within a specified number of layers in the data structure from the electronic invitation for the meeting;
   processing a specific electronic document of the set of electronic documents with a machine learning model comprising at least one of: a language clustering model that has been trained to identify meeting agendas, and a neural network that has been trained to identify meeting agendas;
   determining, based at least in part on the processing of the specific electronic document with the machine learning model, that the specific electronic document relates to the electronic invitation for the meeting;
   surfacing, by a software application, on a user interface of an electronic calendar of one of the meeting invitees based on the determination that the specific electronic document relates to the electronic invitation for the meeting, an indication comprising a selectable user interface element that the specific electronic document is associated with the meeting;
   receiving a selection of the selectable user interface element; and opening, by the software application, the specific electronic document based on receiving the selection.

2. The method of claim 1, wherein the set of the electronic documents that are within the specified number of layers in the data structure is identified from one or more of: a cloud-based application database, a cloud-based document storage database, and a local file directory.

3. The method of claim 1, further comprising:
determining, based on processing of the specific electronic document with the machine learning model, that the specific electronic document is a meeting agenda.

4. comprise resource attachments, and embedded resource links.

5. The method of claim 4, wherein implicit edges in the data structure comprise overlapping attributes between resources.

6. The method of claim 1, wherein determining that the specific electronic document relates to the electronic invitation for the meeting is further based on an overlap of attributes between the electronic invitation for the meeting and the specific electronic document.

7. The method of claim 6, wherein the overlapping attributes comprise one or more of: a date of resource creation, a type of resource, a resource creator, a resource modifier, and a resource content type.

8. A system for providing meeting insights, comprising:
a memory for storing executable program code; and
a processor, functionally coupled to the memory, the processor being responsive to computer-executable instructions contained in the program code and operative to:
receive an electronic invitation for a meeting, wherein there are a plurality of invitees included in the electronic invitation;
access a plurality of related electronic documents comprised in a plurality of layers from the electronic invitation for the meeting in a data structure comprised of resources connected by explicit and implicit edges;
process only a set of the electronic documents that are within a specified number of layers in the data structure from the electronic invitation for the meeting;
process a specific electronic document of the set of electronic documents with a machine learning model comprising at least one of: a language clustering model that has been trained to identify meeting agendas, and a neural network that has been trained to identify meeting agendas;
determine, based at least in part on the processing of the specific electronic document with the machine learning model, that the specific electronic document relates to the electronic invitation for the meeting;
surface, by a software application, on a user interface of an electronic calendar of one of the meeting invitees based on the determination that the specific electronic document relates to the electronic invitation for the meeting, an indication comprising a selectable user interface element that the specific electronic document is associated with the meeting;
receive a selection of the selectable user interface element; and
open, by the software application, the specific electronic document based on receiving the selection.

9. The system of claim 8, wherein the set of electronic documents that are within the specified number of layers in the data structure is identified from one or more of: a cloud-based application database, a cloud-based document storage database, and a local file directory.

10. The system of claim 8, wherein the processor is further responsive to the computer-executable instructions contained in the program code and operative to:
determine, based on processing of the specific electronic document with the machine learning model, that the specific electronic document is a meeting agenda.

11. The system of claim 8, wherein explicit edges in the data structure comprise resource attachments, and embedded resource links.

12. The system of claim 11, wherein implicit edges in the data structure comprise overlapping attributes between resources.

13. The system of claim 8, wherein determining that the specific electronic document relates to the electronic invitation for the meeting is further cased on an overlap of attributes between the electronic invitation for the meeting and the specific electronic document.

14. The system of claim 13, wherein the overlapping attributes comprise one or more of: a date of resource creation, a type of resource, a resource creator, a resource modifier, and a resource content type.

15. A non-transitory computer-readable storage device comprising executable instructions that, when executed by one or more processors, assist with providing meeting insights, the computer-readable storage device including instructions executable by the one or more processor for:
receiving an electronic invitation for a meeting, wherein there are a plurality of invitees included in the electronic invitation;
accessing a plurality of related electronic documents comprised in a plurality of layers from the electronic invitation for the meeting in a data structure comprised of resources connected by explicit and implicit edges;
processing only a set of the electronic documents that are within a specified number of layers in the data structure from the electronic invitation for the meeting;
processing a specific electronic document of the set of electronic documents with a machine learning model comprising at least one of: a language clustering model that has been trained to identify meeting agendas, and a neural network that has been trained to identify meeting agendas;
determining, based at least in part on the processing of the specific electronic document with the machine learning model, that the specific electronic document relates to the electronic invitation for the meeting;
surfacing, by a software application, on a user interface of an electronic calendar of one of the meeting invitees based on the determination that the specific electronic document relates to the electronic invitation for the meeting, an indication comprising a selectable user interface element that the specific electronic document is associated with the meeting;
receiving a selection of the selectable user interface element; and
opening, by the software application, the specific electronic document based on receiving the selection.

16. The non-transitory computer-readable storage device of claim 15, wherein the set of the electronic documents that are within the specified number of layers in the data structure is identified from one or more of: a cloud-based application database, a cloud-based document storage database, and a local file directory.

17. The non-transitory computer-readable storage device of claim 15, wherein the instructions are further executable by the one or more processor for:
   determining, based on processing of the specific electronic document with the machine learning model, that the specific electronic document is a meeting agenda.

18. The non-transitory computer-readable storage device of claim 15, wherein explicit edges in the data structure comprise resource attachments, and embedded resource links.

19. The non-transitory computer-readable storage device of claim 18, wherein implicit edges in the data structure comprise overlapping attributes between resources.

20. The non-transitory computer-readable storage device of claim 15, wherein determining that the specific document relates to the electronic invitation for the meeting is further based on an overlap of attributes between the electronic invitation for the meeting and the specific electronic document.

\* \* \* \* \*